United States Patent
Gibbons

(10) Patent No.: US 11,474,185 B2
(45) Date of Patent: Oct. 18, 2022

(54) METHOD AND APPARATUS FOR DETERMINING THE DIRECTION OF ARRIVAL OF RADIO OR ACOUSTIC SIGNALS, AND FOR TRANSMITTING DIRECTIONAL RADIO OR ACOUSTIC SIGNALS

(71) Applicant: Gregory Dean Gibbons, San Mateo, CA (US)

(72) Inventor: Gregory Dean Gibbons, San Mateo, CA (US)

(*) Notice: Subject to any disclaimer, the term of this patent is extended or adjusted under 35 U.S.C. 154(b) by 132 days.

(21) Appl. No.: 16/938,303

(22) Filed: Jul. 24, 2020

(65) Prior Publication Data

US 2021/0011109 A1     Jan. 14, 2021

Related U.S. Application Data

(63) Continuation of application No. 14/067,910, filed on Oct. 30, 2013, now Pat. No. 10,754,002.

(60) Provisional application No. 61/722,644, filed on Nov. 5, 2012.

(51) Int. Cl.
| | |
|---|---|
| *G01S 19/13* | (2010.01) |
| *G01S 3/46* | (2006.01) |
| *G01S 3/14* | (2006.01) |
| *G01S 3/50* | (2006.01) |
| *G01S 3/48* | (2006.01) |

(52) U.S. Cl.
CPC ............... *G01S 3/46* (2013.01); *G01S 19/13* (2013.01); *G01S 3/14* (2013.01); *G01S 3/465* (2013.01); *G01S 3/48* (2013.01); *G01S 3/50* (2013.01)

(58) Field of Classification Search
CPC ..... G01S 3/46; G01S 3/14; G01S 3/465; G01S 3/48; G01S 3/50; G01S 19/13
USPC .............................................. 342/357.51, 417
See application file for complete search history.

(56) References Cited

U.S. PATENT DOCUMENTS

| | | | |
|---|---|---|---|
| 3,354,461 A | 11/1967 | Kelleher | |
| 3,714,573 A * | 1/1973 | Grossman | ................. G01S 3/46 |
| | | | 375/152 |
| 3,863,256 A | 1/1975 | Smith | |
| 4,164,036 A | 8/1979 | Wax | |
| 4,517,568 A | 5/1985 | Willmore | |
| 4,811,022 A | 3/1989 | Cafarelli | |
| 5,365,239 A | 11/1994 | Stilwell | |
| 5,724,047 A | 3/1998 | Lioio | |
| 6,177,907 B1 | 1/2001 | Golovin | |
| 6,252,867 B1 | 6/2001 | Pfeil | |
| 6,377,213 B1 | 4/2002 | Odachi | |
| 6,891,499 B2 | 5/2005 | Dooley | |

(Continued)

*Primary Examiner* — Chuong P Nguyen
(74) *Attorney, Agent, or Firm* — DLA Piper LLP US

(57) ABSTRACT

A directional receiver system may include a receiver, a plurality of receive antenna elements, and a circuit. The receiver may include an input port and an output. The plurality of receive antenna elements may be fixedly configured into a known geometric relationship to each other, and each of the receive antenna elements may be connected to the input port of the receiver. The circuit may be coupled to the output of the receiver, configured to determine time differences at which signals from a source are incident upon the antenna elements, and configured to determine an angular orientation of the source to the receive antenna elements based on the time differences.

31 Claims, 10 Drawing Sheets

(56) References Cited

U.S. PATENT DOCUMENTS

| | | | |
|---|---|---|---|
| 7,342,535 B2* | 3/2008 | Ann | G01S 3/74 |
| | | | 342/373 |
| 7,409,226 B1 | 8/2008 | Stevenson | |
| 8,731,579 B2* | 5/2014 | Siomina | G01S 3/28 |
| | | | 455/456.1 |
| 8,868,133 B1* | 10/2014 | Rosenbaum | G01S 5/08 |
| | | | 455/562.1 |
| 8,884,820 B2* | 11/2014 | Poisel | G01S 5/0221 |
| | | | 342/465 |
| 9,989,633 B1* | 6/2018 | Pandey | G01S 13/42 |
| 10,349,213 B2* | 7/2019 | Berger | H04W 56/0065 |
| 10,539,645 B2* | 1/2020 | Bialer | G01S 3/50 |
| 11,085,990 B2* | 8/2021 | Park | G01S 3/48 |
| 2002/0135513 A1 | 9/2002 | Paschen | |
| 2005/0195103 A1 | 9/2005 | Davis | |
| 2006/0022801 A1 | 2/2006 | Husak | |
| 2008/0318591 A1 | 12/2008 | Oliver | |
| 2009/0015474 A1 | 1/2009 | Wicks | |
| 2016/0007315 A1 | 1/2016 | Lundgreen | |
| 2020/0264256 A1* | 8/2020 | Stitt | H03D 7/165 |
| 2020/0264257 A1* | 8/2020 | Stitt | G01S 3/465 |

\* cited by examiner

METHOD AND APPARATUS FOR DETERMINING THE DIRECTION OF ARRIVAL OF RADIO OR ACOUSTIC SIGNALS, AND FOR TRANSMITTING DIRECTIONAL RADIO OR ACOUSTIC SIGNALS

CROSS-REFERENCE TO RELATED APPLICATIONS

This application is a continued application of U.S. Non-Provisional patent application Ser. No. 14/067,910, filed Oct. 30, 2013, which claims priority benefit of U.S. Provisional Patent Application No. 61/722,644, filed Nov. 5, 2012. The entire content of these applications are herein incorporated by reference in their entireties.

SUMMARY

Systems and methods described herein may include a directional receive antenna with a plurality of antenna elements connected to a single input port of a receiver/processor device, the receiver/processor device being equipped with a process for precisely measuring the time of arrival of received signals and for combining knowledge of the relative positions of the receive antenna elements and the delays associated with the various cables, connectors, pads, or other devices involved, with observed differences in the time of arrival of signals of interest at pairs of the plurality of antenna elements, to derive accurate angle of arrival measurements of those signals of interest. In embodiments of the present invention in which these times of arrival measurements are accomplished using digitized signals, the embodiments may resolve the time of arrival to significantly less than a single sample interval. Embodiments may also include a transmit antenna with a plurality of antenna elements connected to a single output port of a transmitter device, the connections being precisely prepared so that the signal emitted by the transmitter device arrives at the plurality of antenna elements at precisely known relative times, and the physical relative positions of the antenna elements being rigidly fixed and precisely known, thereby enabling a distant receiver, using this knowledge of geometry and delays in the transmit antenna, to determine the angle between the transmit antenna's orientation and the receive antenna's location.

The capabilities of the systems and methods described herein may support a variety of applications. In addition, the features described herein may incorporate transponders, which may be used for example to permit air traffic controllers to determine the range to transponder equipped aircraft.

DETAILED DESCRIPTION OF SEVERAL EMBODIMENTS

This detailed description will first refer to an example embodiment of a directional receiver in which there are two antenna elements 10, 20 (see FIG. 1), together with other components and processes. Those skilled in the art will recognize that the arrangements and phenomena described will generalize in a straightforward way to other embodiments involving larger numbers of antenna elements, and similarly, the arrangements and phenomena described will apply in a straightforward way to transmitter embodiments. Similarly, those skilled in the art will recognize that the arrangements and phenomena described can apply to embodiments utilizing acoustic or RF energy.

Some embodiments of the present invention may use analog implementation. However, this description will focus on embodiments in which digital signal processing accomplishes the measurement and estimation functions.

Directional Reception

By connecting a plurality of antenna elements 10, 20 to a single input port of a receiver processor circuit 110 (see FIG. 3), any errors introduced in the electronics of the receiver/processor circuit 110 may be rendered common mode, so that the effects of these errors cancel out in the calculation of the angle of arrival. Used for reception, the time of arrival measuring process 215 (see FIG. 3a) may be able to obtain better time difference of arrival precision and accuracy than would be possible in a system using two separate receivers, other things being held equal. The resulting angle of arrival accuracy may make possible accurate directional antenna performance with small antenna apertures.

Figure 1:
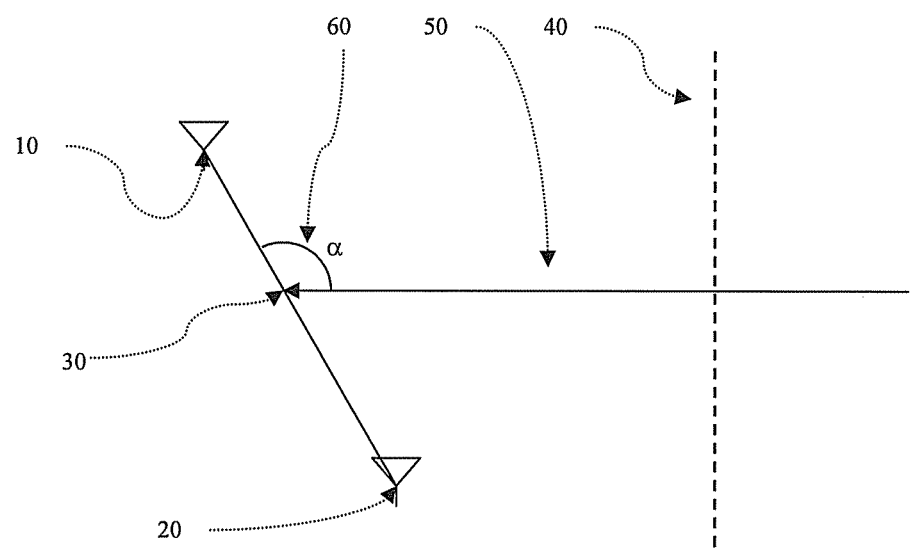
FIG. 1 shows a representative embodiment of the present invention, comprising a pair of antenna elements, a planar wavefront from a distant transmitter approaching the antenna elements, and the angle of arrival (AOA) between the line between the two antenna elements and the direction of the arriving wavefront.

FIG. 1 shows a representative embodiment of the present invention comprising a pair of antenna elements 10, 20, and a planar wavefront 40 from a distant transmitter approaching the antenna elements 10, 20, and the angle of arrival (AOA)

a 60 between the line between the two antenna elements and the direction 50 of the arriving wavefront 40. Seen in two dimensions, in the plane defined by the location of the distant transmitter and the locations of the antenna elements 10, 20, if wave front 40 is effectively planar (so that it cuts the plane formed by antenna elements 10, 20 and the distant transmitter in a straight line), then this angle α 60 is a function of c, TDOA, and b, where c is the speed of transmission of the wave front 40 in the medium, in meters per second, TDOA is the time difference in seconds between the time of arrival of wave front 40 at the nearest antenna element 20 and the time of arrival at the other antenna element 10, and b is the distance in meters between the two antenna elements 10, 20. The value of c is known with precision; thus if the value of b were precisely known, and the TDOA could be precisely measured, then the angle α 60 could be accurately calculated.

Those skilled in the art will recognize that the wave front emitted by a transmitter will be approximately planar at long range, and at more moderate ranges the wave front will exhibit measureable curvature. We use the planar example for clarity of presentation of the architecture of the antenna and its effect on TDOA estimation accuracy.

Figure 3:
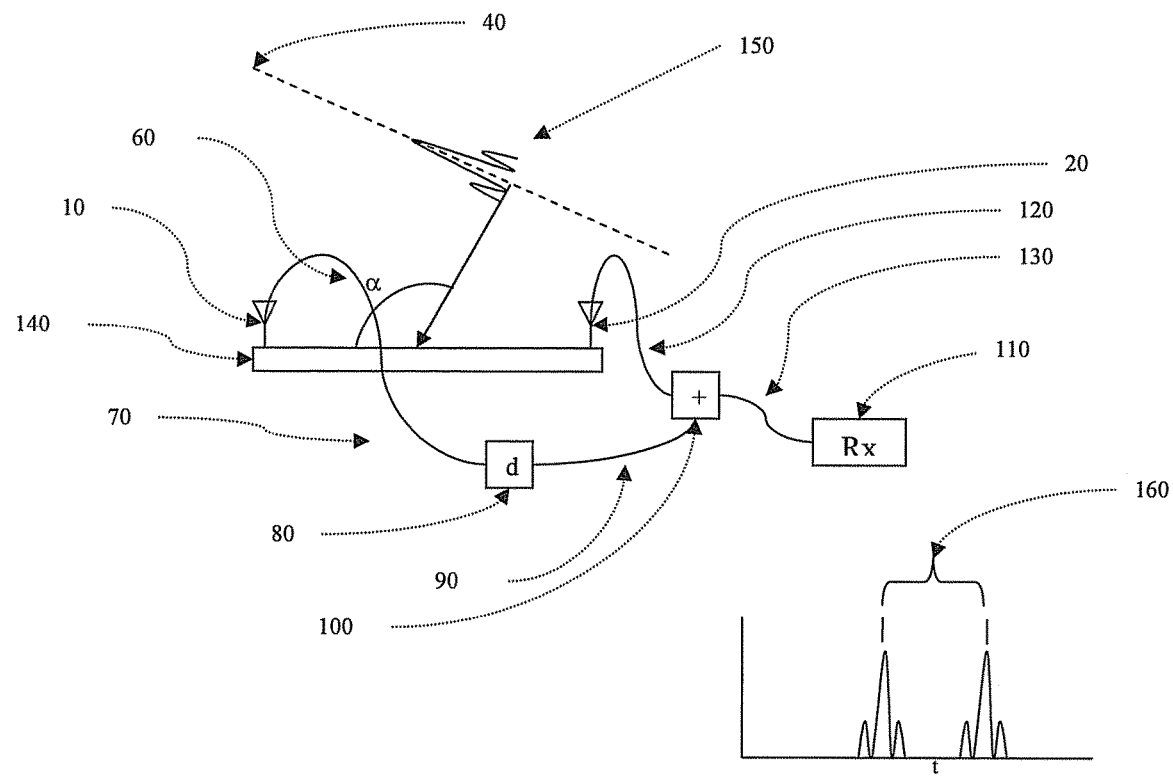
FIG. 3 shows a representative embodiment of the present invention including a planar wavefront moving toward antenna elements.

FIG. 3 shows a representative embodiment of the present invention including the planar wavefront 40 moving toward antenna elements 10, 20. Antenna elements 10, 20 are shown rigidly attached to a rigid structure 140 which holds antenna elements 10, 20 at a stable distance from each other. FIG. 3 also shows broadband signal 150 in the planar wavefront 40, about to arrive first at antenna element 20 and later at antenna element 10. FIG. 3 also shows the time difference of arrival (TDOA) 160 of two copies of signal 150 passing through the cable 130, into receiver processor circuit 110, which will process the received signal and measure the TDOA 160 of the two copies of signal 150. In embodiments employing spread spectrum RF signals, after compression or de-spreading, the incoming signal will be effectively a pulse 150, and having propagated through the antenna elements 10, 20 and their electrical connections to the receiver processor circuit 110, pulse 150 will result in a TDOA 160 observable by receiver processor circuit 110, as described in FIG. 4 below.

Figure 3A:
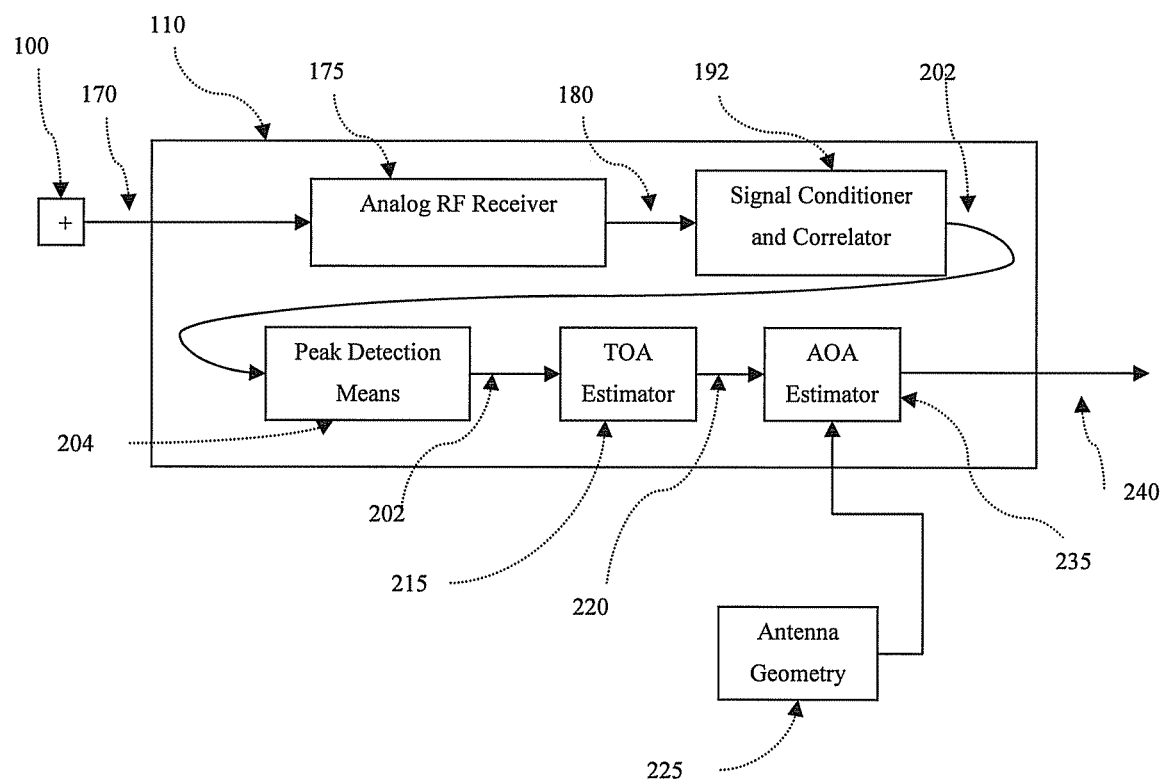
FIG. 3a is a block diagram of an embodiment of the receiver/processor circuit 110 of the present invention.

FIG. 3a is a block diagram of an embodiment of the receiver/processor circuit 110 of the present invention, illustrating a sequence of transformations that may be applied by receiver/processor circuit 110 to the energy 170 of signal 50 as collected by the elements of the directional antenna and combined by combiner 100 and presented to the analog section 175 of receiver/processor circuit 110, eventually resulting in the output angle of arrival measurement 240. In this process, signal energy 170 is fed to Analog RF Receiver 175 which produces the baseband complex signal 180. Signal 180 is presented to conditioner and correlator module 192, which produces matched filter output 202. Output 202 is processed by Peak Detection module 204, which identifies the correlation peaks 202 and passes them to the TOA estimator 215. The resulting TOA estimates 220 are passed to the AOA Estimator 235. AOA Estimator 235 combines the TOA estimates 220 with knowledge of the antenna geometry and various delays 225 to produce the estimated AOA 240 for each signal of interest.

Figure 4:
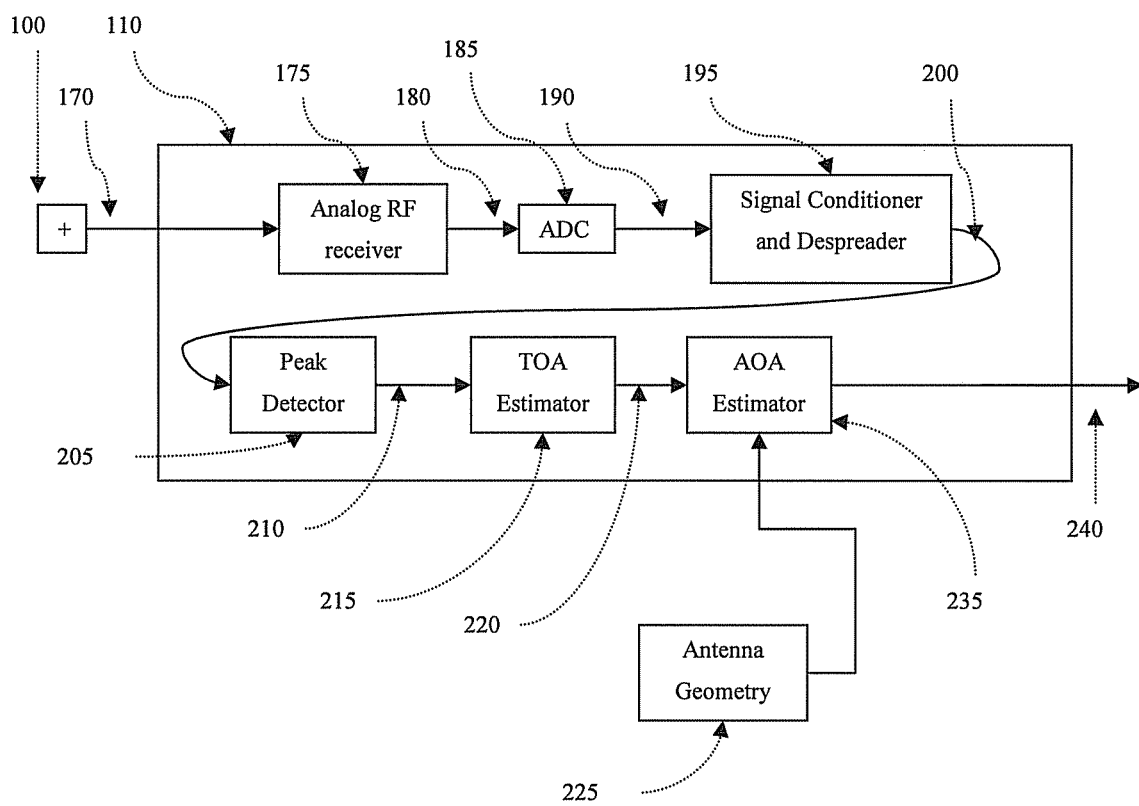
FIG. 4 is a block diagram of an embodiment of a receiver/processor element of the present invention.

FIG. 4 is a block diagram of an embodiment of the receiver/processor circuit 110 of the present invention, illustrating a sequence of transformations that may be applied by receiver/processor circuit 110 to the energy 170 of signal 50 as collected by the elements of the directional antenna and combined by combiner 100 and presented to the analog section 175 of receiver/processor circuit 110, eventually resulting in the output angle of arrival measurement 240. In this process, signal energy 170 is fed to Analog RF Receiver 175 which filters and down-converts analog signal 170 to produce the baseband complex signal 180. In some embodiments of the present invention, this down-conversion may be to an intermediate frequency (IF) and may result in a real signal at IF, and the following processes will then operate on the real signal as appropriate. These implementation choices have no effect on the desired operation of the present invention, as will be apparent to those skilled in the art. ADC 185 may sample baseband signal 180 at at least the Nyquist rate, producing digital signal 190. In this embodiment of the invention, the signal in use can be a brief pulse, or a signal comprised of a burst of low energy brief pulses which have been produced by a possibly sparse spreading code in the transmitter, which spreading code is known to the receiver, and where the receiver/processor circuit 110 can be de-spread by use of the spreading code, to produce a single compressed pulse having the total energy in the original pulse burst. Signal conditioner and de-spreader 195 may apply algorithms to condition the incoming signal 190 and if it was a burst of pulses to de-spread it, producing matched filter output 200. The peak detector 205 identifies the broadband signals of interest 210 and passes them to TOA Estimator 215, which may apply algorithms to make precision estimates of time of arrival with respect to the local clock for each signal of interest 210. The peak detection process 205 may calculate the SNR of each sample of the recovered digital signal and produce measurements 210 of the arriving signals. The resulting TOA estimates 220 are passed to the AOA Estimator 235, which may combine the TOA estimates 220 with knowledge of the antenna geometry and various delays 225 to produce the estimated AOA 240 for each signal of interest. Knowledge 225 may include not only the precise relative positions of the phase centers of the antenna elements 10, 20, but also the precise delays due to coax cables 70, 90, 120, 130 and delay element 80 and combiner 100. Those skilled in the art will recognize that the signals of interest 210 can encode additional information bits, and that the observed time of arrival (TOA) of the brief/compressed pulse can be used for ranging and time transfer applications, so that the present invention of precision AOA estimation can fit smoothly within the widely used architecture that applies digital signal processing algorithms to digital representations of received signals, including various types of spread spectrum waveforms.

The processor circuit 110 may achieve its increased AOA measuring performance while receiving and measuring the angle of arrival of incoming signals from multiple directions without the need for antenna steering, either physical or electrical. For example, if the individual antenna elements are omni-directional, then the directional receiver will provide AOA measurements from all directions. (Note that the determination of angle α 60 may be most accurate when the direction of arrival 50 is nearly perpendicular to the line between antenna elements 10, 20.)

Figure 6:
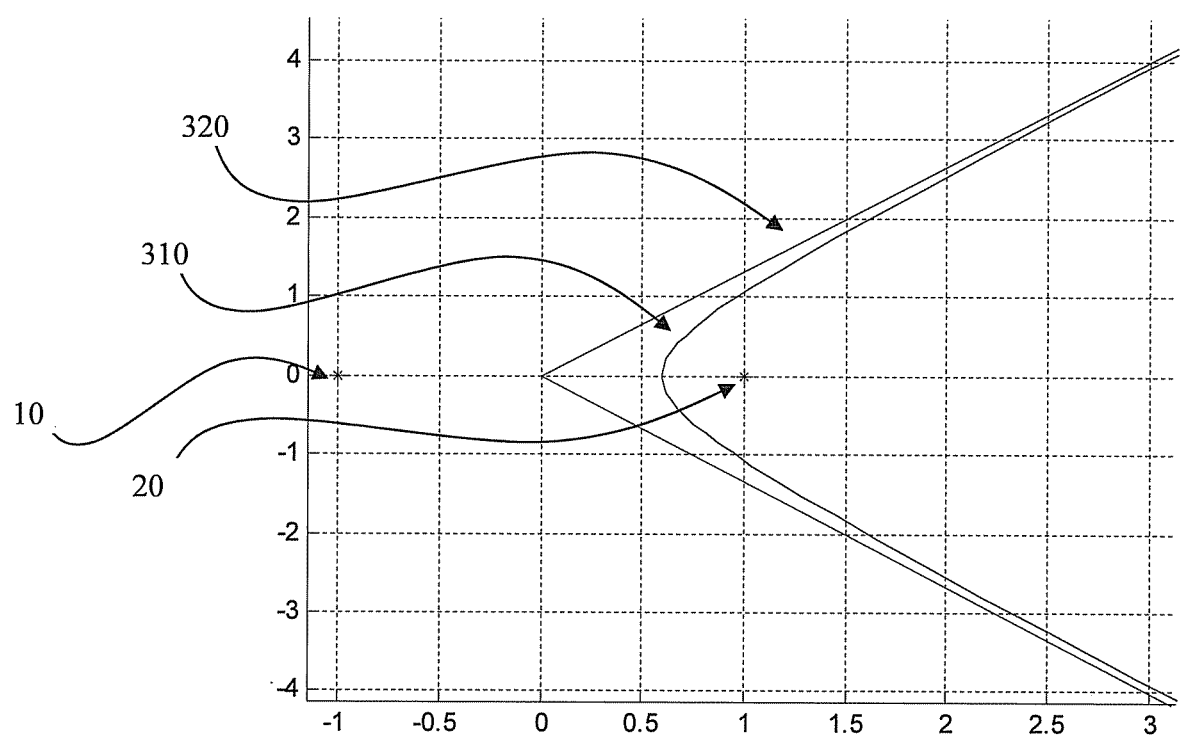
FIG. 6 shows a representative embodiment of the present invention including receive antenna elements and curve which is the locus of possible positions of a signal source whose TDOA between the two antenna elements is a constant value.

Referring again to FIG. 1, if wavefront 40 is perfectly flat then when it passes antenna element 20, it will be a distance c*TDOA from antenna element 10. Elementary geometry shows therefore that the arrival angle α 60 will be α=arccos (c*TDOA/b), where b is, as above, the distance, or aperture, between the two antenna elements 10, 20. One skilled in the art will recognize that the AOA will have a left/right ambiguity about the x axis, as shown in FIG. 6.

The accuracy of the measurement of angle 60 may depend sensitively on the accuracy of the measurement of the TDOA, which in turn is based on the measurement of the time of arrival (TOA) of wave front 40 at each of the antenna elements 10, 20. Errors may be made in the measurement of these TOA values, but because the TDOA measurement process and apparatus are so arranged that some of the TOA errors are common mode, those common mode TOA errors will not contribute to the overall TDOA error. If the signals received by the antenna elements 10, 20 can be combined and fed to a single receiver processor circuit 110, then many types of errors in the processing, such as synchronization of multiple processors and clocks and instrumentation delay in different devices, will be common mode, and will not enter into the computation of the TDOA.

Methods of Accurately Estimating Time of Arrival

The first approximation of TOA of such a pulse waveform might be simply the time of arrival relative to the receiver clock of the sample having the maximum amplitude within the pulse. This TOA estimate may have typical errors on the order of the duration of the sample interval. TDOAs based on such TOA estimates may have unacceptable precision for use in calculating angle of arrival using antennas of modest aperture.

Considering now the operation of the TOA estimator 215, in one embodiment of the present invention, using signals 150 comprising either short duration pulse waveforms or spread spectrum waveforms which become short duration waveforms after de-spreading, the pulses in signal 150 will be of short duration, and basing the TOA estimate on measurement of the time of the passage of the peak may be an appropriate approach. Alternatively, one could measure the arrival time by estimation of the arrival time of the leading edge of the signal; this latter approach could be employed in the case of signals having high band-width, and correspondingly sharp rising edges, but relatively long signal durations. Similarly, this approach could be useful in avoiding multipath effects in cases in which the multipath delay is longer than the rise time of the signal.

Figure 5:
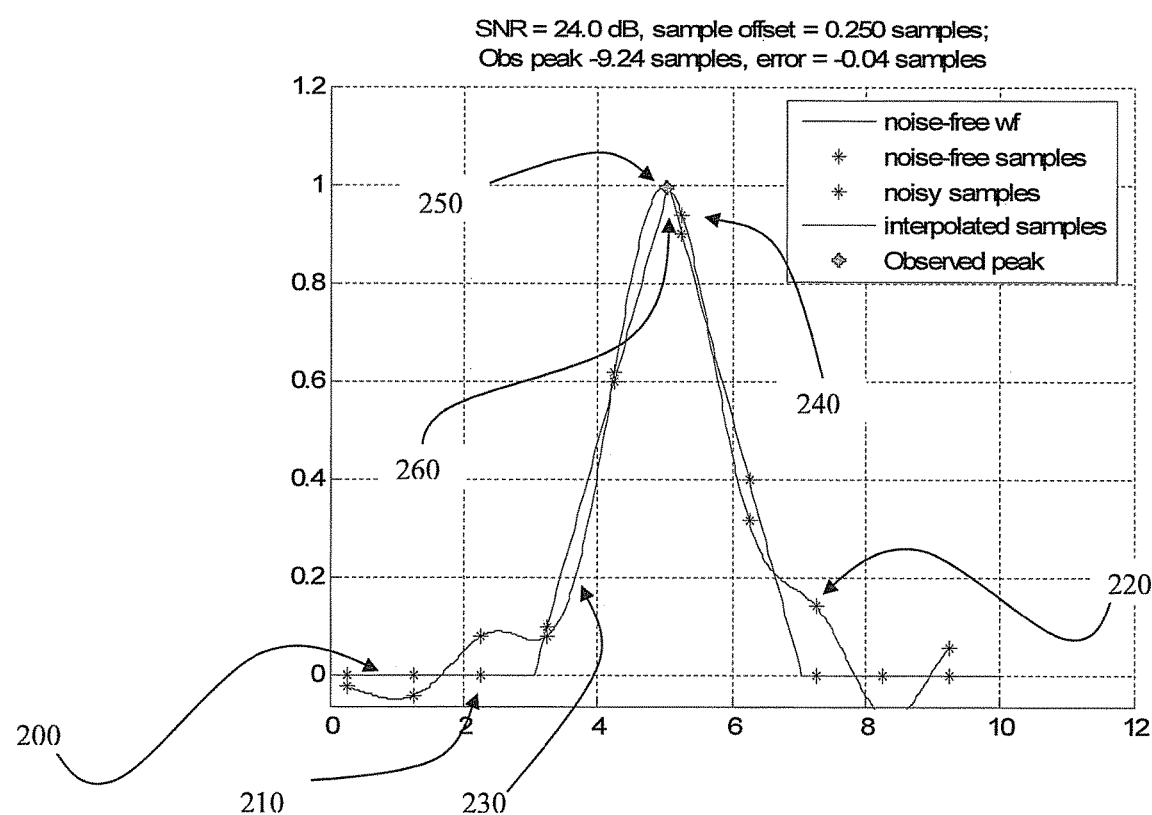
FIG. 5 illustrates the effect of re-sampling a digital sample of a received brief/compressed pulse waveform plus noise, to improve the estimated time of arrival of the peak of the signal, according to an embodiment of the invention.

FIG. 5 illustrates the effect of re-sampling a digital sample of a received brief/compressed pulse waveform 150 plus noise, to improve the estimated time of arrival of the peak of the signal, according to an embodiment of the invention. In FIG. 5, the simulated-noise free analog signal 200 is shown as a continuous line, with simulated noise free samples 210 of the analog signal shown as asterisks on that line. Adding simulated noise to the samples with, for example, SNR at the peak of 24 dB, FIG. 5 also shows the noisy samples 220 as asterisks on the simulated continuous signal plus noise 230. In this example, the peak simulated noisy sample 240 is significantly later than the true peak amplitude of the simulated signal plus noise 250, which itself is very close in time to the true peak time 260 of the simulated noise free simulated signal. Re-sampling at a much higher rate than the original sampling frequency may thus move the time of the peak sample very close to the true time of arrival of the peak signal, given adequate SNR of the received signal.

The samples 230 in this example are produced by a process known to those skilled in the art as "re-sampling" using sinc interpolation. The Nyquist sampling theorem tells us that if the sampling frequency exceeds twice the frequency of the highest frequency component of a real signal, then the real signal can be recovered exactly from the samples. Signals 150 that will be band-limited by band-pass filters may be of interest. We may consider the noise present in the received noisy samples 220 as being band limited as well, since any out-of-band noise may be filtered out or simply alias into the pass band of our receiver. From the above we conclude that our digital signal sample 220 can be re-sampled to recover the continuous signal plus noise 230 to arbitrarily high resolution by using sufficiently high re-sampling frequency. As the re-sampling frequency increases, the time of the peak sample in the re-sampled data will approach the true peak time of the received band limited signal plus noise. This process is illustrated in FIG. 5, where the re-sampled (sinc interpolated) signal plus noise peak 250 is closer to the simulated true TOA 260 than the peak noisy sample 240.

In an alternative embodiment, the TOA estimator 215 of FIG. 4 may be designed to adjust the sampled signal in such a way that the true peak (or leading edge) arrival time corresponds precisely to the time of the highest amplitude (or leading edge) sample. One approach is to employ the Delay Theorem of Fourier theory, to use the detected peaks 215 represented in the complex frequency domain, and perform a search for the delay that maximizes the amplitude of the peak sample in each received signal. This may identify the peak arrival time of the signal plus noise, because the peak amplitude is maximum when the time of the particular sample coincides with the arrival time of the peak. If the sample time is not equal to the peak arrival time, the two samples that bracket the true peak will have less amplitude than a sample taken at the peak.

In this process, one may conduct a binary search or other type of search within a limited range of delay values for that additive delay value in the frequency domain that maximizes the corresponding peak time domain value. Since the broadband signals involved may be of short duration, the range of legitimate candidate delay values is small, and the number of points to be transformed between the frequency and time domains is correspondingly small, so that it may be computationally practical to search several possible delay values for the desired optimal value. In this manner a precise TOA for the signal of interest (plus noise and interference) may be obtained.

Alternatively, one may match the received signal plus noise with a reference copy of the sought signal in either the time domain or the frequency domain.

For signals 150 whose shape, or shape after dispreading, exhibits a rise time of the order of two nanoseconds or less, even the typical short delay multipath encountered may not substantially affect the shape of the rising edge of the signal. Therefore one may apply a curve-fitting technique addressed to the expected shape of the rising edge of the signal of interest 150. Taking TOA estimates based on such measurements of the rising edge, one may obtain accurate TDOA estimates by differencing the pair of TOA estimates.

Note that in any case the achievable error depends on the Signal-to-Noise Ratio (SNR), since for low SNR samples the noise can have a relatively large effect on amplitude of signal plus noise, thereby possibly resulting in a signal plus noise peak distant in time from the true peak arrival time of the signal. The possible shifting of peak arrival times due to noise is well known to those skilled in the art, and system planning that provides adequate SNR may deal with the problem.

Method of Calculating AOA—Two Antenna Element Case

The locus of possible transmitter locations (in the plane formed by the transmitter and receiver antenna elements 10, 20) that correspond to a particular TDOA δ forms one branch of a hyperbola whose foci are the receive antenna locations. (The other branch is excluded because the observed data shows which antenna received the signal first.) Those skilled in the art will recognize that by shifting and rotating the coordinates of receiver antenna elements 10 and 20 such that the midpoint between them is at [0, 0] and elements 10 and 20 are both on the x axis, one may estimate the arrival angle with the slope of the asymptote of the resulting hyperbola. The slope will be positive or negative according to which side of the axis of the antenna pair 10, 20 the signal arrives from. This is the well known left-right ambiguity of such angle of arrival calculations. For transmitters distant from the antenna array by many times the distance between antenna elements 10 and 20, this estimate may be accurate to within a fraction of a degree, the error approaching zero asymptotically as the range increases.

FIG. 6 shows a representative embodiment of the present invention including receive antenna elements 10, 20 and curve 310 which is the locus of possible positions of a signal source whose TDOA between the two antenna elements 10, 20 is a constant value. Curve 310 is one half of the hyperbola which is the locus of points whose distances from the positions of the two antenna elements 10, 20 is the constant c*|TDOA|, where c is the speed of light. Lines 320 are the asymptotes of this half of the hyperbola. The figure illustrates that for transmitters distant by many multiples of the distance between receiver elements 10, 20, the direction to the receiver may be closely approximated by the direction of the asymptote.

In FIG. 6, the hyperbola is centered at (0, 0), and receiver antenna elements 10, 20 are located at (−1, 0) and (1, 0) respectively. As before, we may assume the transmitter is nearer antenna element 20 than antenna element 10, and therefore must be somewhere on the right arm of the hyperbola. The difference between the angle of the asymptote and the angle to a point (x, y) on the hyperbola is a function of range, or (x^2+y^2)^0.5. At ranges of many times the aperture, the locus 310 lies very close to the asymptote 320, and arccos(c*TDOA/b) may be a good approximation to AOA from (x, y) to (0, 0). At short ranges, the error can grow to be significant. Thus for applications in which accurate AOA is required with the range to the transmitter being less than several times the aperture, the arccos (c*TDOA/b), estimate may be insufficiently accurate.

The general form of the equation for a hyperbola as shown in FIG. 6 is $$1 = \left(\frac{x}{u}\right)^2 - \left(\frac{y}{v}\right)^2$$

where the slope of the asymptote is m=+/−v/u, the range difference from a point on the hyperbola to the two foci is 2*u, and the distance b/2 from (0, 0) to either focus is $$\frac{b}{2} = \sqrt{u^2 + v^2}$$

Solving for y in terms of x, we have $$y = \sqrt{\left(\frac{x}{u}\right)^2 - 1} \, v$$

Thus for x>>u, the root approaches x/u, y approaches v*x/u and (x, y) approaches (x, v*x/u)=m*x. That is, (x, y) approaches the asymptote. When x is less than several times u, y diverges from m*x and the angle from the center to (x, y) diverges from slope m, and the difference is a function of x. In those cases, one can either apply the above equation using a value for the transmitter range, if one is known, or use a directional antenna with a smaller aperture, and correspondingly smaller range-dependent AOA error.

AOA accuracy will increase with increasing aperture, other things being held equal. The impact on AOA error of error in TDOA measurement may also decrease with increasing aperture. But AOA error using the asymptote increases with decreasing range, and is significant at short ranges. Therefore in designing systems wherein close range AOA accuracy is required and means of accurately determining range to the transmitter are not available, this tradeoff may need to be evaluated.

Some embodiments of the present invention may enable the receiver to estimate the range to the transmitter by making use of the curvature of the incoming signal. One way to accomplish this may be to use three antenna elements (co-planar with the transmitter, since we are here discussing the two-dimensional case) on a rigid mounting, with the middle element closer to one end, and combining the signals from the three antenna elements as described herein. The three copies of the incoming signal will then present three pairs of signals suitable for AOA estimation as described herein. In applications where the aperture can be large, this arrangement may give the effect of having both large and (relatively) small aperture antennas. The asymptote corresponding to the small aperture antenna pair may more closely approximate the true path of the signal from the transmitter (to the center of the small aperture antenna pair), and may be accurate given that the aperture of the antenna pair is small compared to the range to the transmitter. Any curvature in the incident signal will have a larger effect on the AOA measured by the antenna pair with larger aperture. For transmitters sufficiently close to the two antenna pairs, these two AOA estimates (adjusted to refer to the same point on their receiving platform) may differ, with that from the smaller aperture giving the more accurate AOA, and the difference providing a basis for estimating the range to the transmitter.

Having thus obtained an estimate to of the range to the antenna, the AOA estimate can be further refined by using the above formula involving x for points on the hyperbola.

This could be useful, for example, in precision station keeping for large aircraft, where a large aperture is available by use of antenna elements on wingtips, and where true ranges from the transmitter in the lead aircraft may be only a modest multiple of the wingtip to wingtip aperture.

Alternatively, in applications requiring accurate AOA at both long range and short range one could use two receivers, one using the wide aperture pair for precision long range AOA measurement, and the other using both the wide aperture pair and a relatively small aperture pair for accurate AOA to close-in transmitters, as described above.

Note that if appropriate, a single antenna element could be arranged to provide its signal to more than one receiver, using signal splitters, low noise amplifiers (LNAs), pads, and delays as appropriate. Similarly, a receiver configured to switch between antenna feeds could make use of an antenna array with more than one output line, switching between them, for example to obtain either a large aperture or a small aperture input. Similarly, in a receiver with, for example, two channels, one channel could take its signal from an array with several antenna elements, to obtain directional information, and the other channel could take a signal from only one antenna element, for example to make recovery of an information message easier. There are numerous variations on this concept, as will be evident to those skilled in the art.

A single pair of antenna elements may yield best angle resolution beam-on and worst at endfire. One way to prevent poor performance in some directions is to use an array of three antenna elements not co-linear with each other. For example, endfire for two of three equally spaced antennas will provide reasonable performance for the other two pairs, and overall performance may be acceptable in any direction.

Method of Calculating AOA—Multi Antenna Element Case

Those skilled in the art will recognize that the two antenna element case applies in the two dimensional domain, as described above. Considering the two element antenna in three dimensions, the transmitter will be located on a hyperbola of rotation about the axis between the two antenna elements. With the addition of a third antenna element, not collinear with the first two, the geometry will define a three dimensional space containing the plane defined by the locations of the three antenna elements, with the transmitter not necessarily coplanar with the antenna elements. That is, the observed AOA will be the angle between the ray from the transmitter to the position of the antenna array on the plane of the three antenna elements. The observed AOA will be ambiguous as to the side of the plane containing the signal source. Addition of a fourth antenna element, not co-planar with the first three, may remove the ambiguity and provide a single three dimensional AOA. Additional antenna elements can be added, to provide more measurements and improved resolution.

Similarly, a plurality of receivers, directional or not, can collaborate to combine their measurements of the received signal to develop AOA estimates, position estimates etc. as appropriate to the geometry of the situation. For example, a plurality of directional receivers placed separately at accurately known locations may be configured to observe their respective AOAs to a particular transmitter, and use the resulting geometry to localize the transmitter at the best estimate of the intersection of the set of AOAs from the positions of the receivers.

Individual measurements based entirely on directional antennas may result in AOA information relative to the geometry of the antenna array. For example, three antenna elements affixed rigidly to an aircraft may support AOA with respect to the plane of the three antenna elements. The coordinates can be rotated first to the reference axes of the aircraft itself, based on data giving the antenna placement on the aircraft structure. Then, using information from onboard systems (attitude, compass, inertial navigation system (INS) etc.), the coordinates can be rotated from the orientation of the aircraft to the local three dimensional Euclidean space centered at the aircraft and oriented to the local horizon. Finally, if global positioning system (GPS) information is available, or INS is accurate, or AOAs from accurately known locations are available, the data can be registered to the GPS grid.

In some geometries the ambiguity (left-right in two dimensions, which side of the plane in three dimensions using three antenna elements) may be easily resolved. For example, an aircraft tracking a ground transmitter will know that the signal comes from below the aircraft, in general. Integrating the receiver AOA information with tracking functions may resolve these ambiguities if a series of observations involving moving aircraft or transmitters is available Another example of a way to obtain unambiguous three dimensional AOA measurements is to use an array of four receive antenna elements, with two antenna elements combined to feed each of two receiver processor circuits 110, wherein the axes of the two antenna arrays share a center point and are orthogonal. In such an arrangement, each receiver processor element may provide accurate two dimensional AOA measurement in the plane defined by the relative orientation of its pair of receive antenna elements 10, 20 and the transmitter. By combining the results from pairs of two dimensional measurements with knowledge of the orientation of the two axes in three dimensions, one can calculate an accurate three dimensional AOA. For a single transmitted signal, these AOA observations may have a two fold ambiguity in each of the two planes. For guidance of a fast-moving receiver, e.g. an aircraft or other air/space based vehicle, combining two or more observations over even a short interval may resolve these ambiguities.

Alternatively, one could arrange four antenna elements in a tetrahedron, with three being used to observe AOA with respect to the plane defined by the three antenna elements, and the fourth antenna element paired with any of the others providing resolution of the ambiguity. This is only one of many combinations of directional receiver and geometric configuration of the systems and methods described herein that can be adapted for various applications.

Transmission

Employing the principles described herein, a transmitter can be created that produces a signal with direction-dependent characteristics. It should be understood that this is not directional transmission in the sense of a narrow beam antenna; rather, the transmitter may produce a signal with measurable characteristics (other than amplitude) which depend upon the receiver's location with respect to the orientation of the transmitter antenna. Such a transmitter could use antenna elements of any desired radiation pattern, from omni-directional to narrow beam, as appropriate for the application. For clarity of exposition, such a signal with direction-dependent characteristics will be explained by reference to an embodiment containing two transmit antenna elements. As is the case with the directional receiver embodiment described above, those skilled in the art will recognize that the arrangements and phenomena described may generalize in a straightforward way to other embodiments involving larger numbers of antenna elements.

Figure 7:
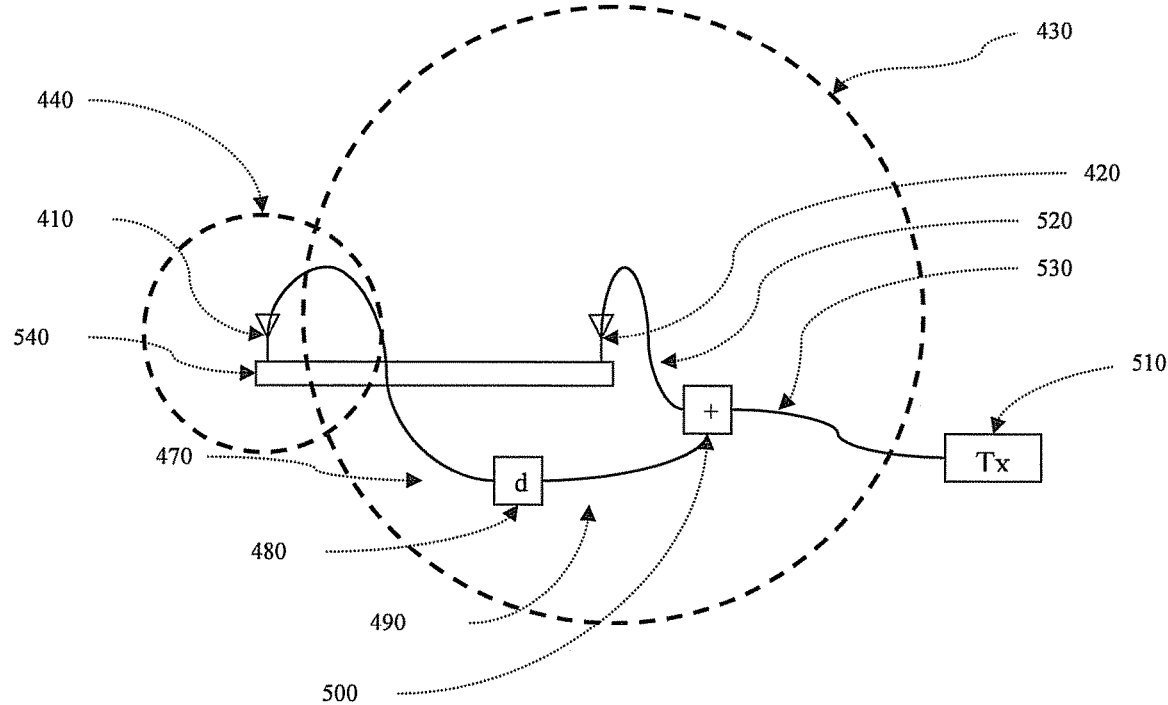
FIG. 7 shows a representative embodiment of the present invention including a transmit antenna array comprising of antenna elements, said antenna elements being held rigidly at a specific distance from each other by rigid supporting structure.

FIG. 7 shows a representative embodiment of the present invention including a transmit antenna array comprising antenna elements 410, 420, the antenna elements being held rigidly at a specific distance from each other by rigid supporting structure 540. Signals from a single output port of a transmitter 510 move through cable 530 to splitter 500, one output of splitter 500 going via cable 520 to transmit antenna element 420, and the other output of splitter 500 going via cable 490 through a delay device 480 and thence via cable 470 to antenna element 410. The delays from the transmitter port to each of the transmitter antenna elements 410, 420 are arranged using cables 470, 490, 520 and delay element 480 to be suitable for the purpose and accurately maintained. The signal from transmitter 510 arrives earlier at antenna element 420 than at antenna element 410. FIG. 7 illustrates this time difference by showing wavefront 430, emitted by antenna element 420, having propagated further than the corresponding wavefront 440 emitted by antenna element 410.

The signals from transmitter 510 are emitted from transmit antenna elements 410, 420 with a delay caused by the delay element 480 and the difference in delays between that caused by cables 470 and 490 versus that caused by cable 520. The resulting wavefronts 430, 440 incorporate the net delay imposed by this delay structure.

Figure 8:
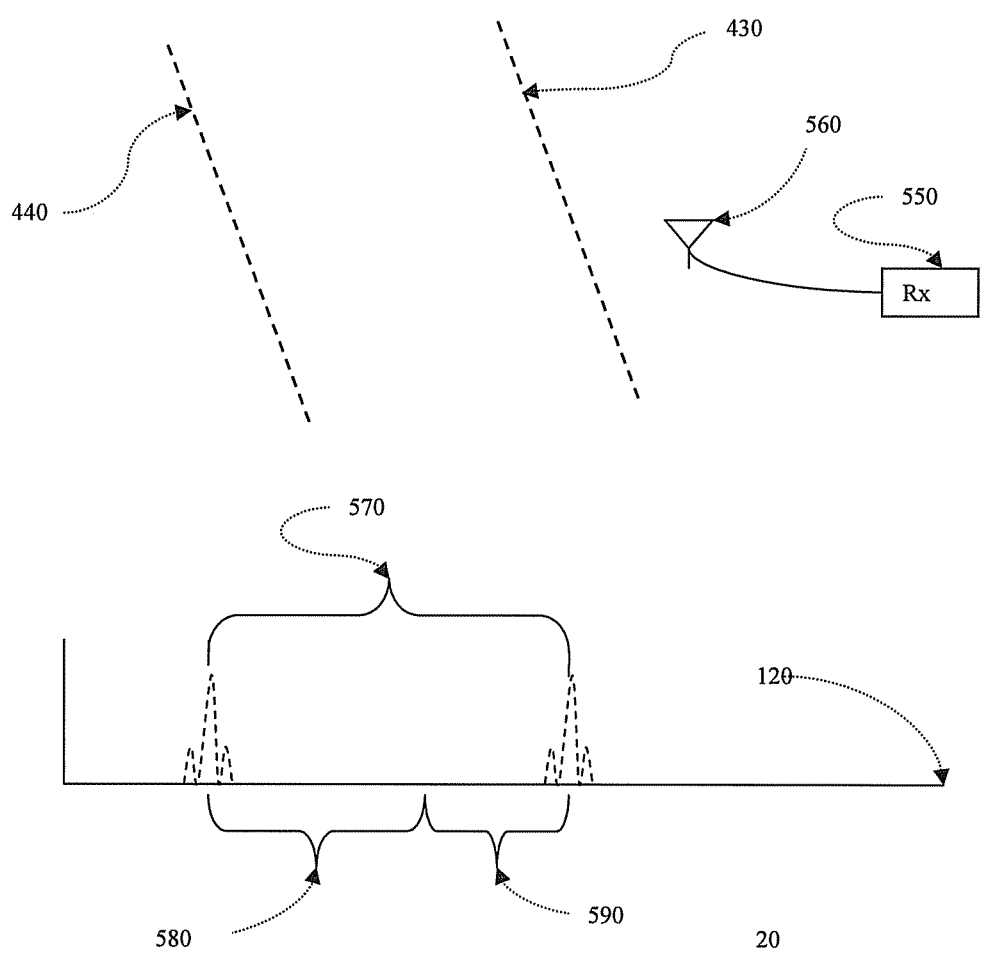
FIG. 8 shows a representative embodiment of the present invention including a receiver with a single receiver antenna element, located distant from the transmitter arrangement shown in FIG. 7, with wavefronts originating from transmitter antenna elements about to arrive at receiver antenna element.

FIG. 8 shows a representative embodiment of the present invention including a receiver 550 with a single receiver antenna element 560, located distant from the transmitter arrangement shown in FIG. 7, with wavefronts 430, 440, originating from transmitter antenna elements 420 and 410 respectively, about to arrive at receiver antenna element 560. For clarity of exposition, the wavefronts are shown as being effectively flat, as if the receiver antenna element 560 were far distant from the transmitter of FIG. 7. As those wavefronts 430, 440 sweep by antenna element 560, their TDOA 570 as observed by receiver 550 will be the sum of two TDOAs: TDOA 580 and TDOA 590. TDOA 580 is due to the delay structure of the splitter 500, delay element 480, and cable delays in cables 520, 490 and 470 as shown in FIG. 7. This delay may be known to receiver 550. TDOA 590 is the delay produced by the geometry: the angle from the center of the axis between transmitter antenna elements 420, 410, and the location of receiver antenna element 560.

Receiver 550 may observe the TDOA 570 of said wavefronts. Given that the structure and delays of the transmitter apparatus shown in FIG. 7 are known to receiver 550, the net delay due to cables 470, 490 and 520 plus delay element 480, shown as delay 580, may be known to receiver 550. Subtracting known net delay 580 from observed TDOA 570, receiver 550 may calculate effective delay 590. The effective delay may be caused solely by the geometry of the situation. In the plane defined by the two transmit antenna elements and the position of the receiver antenna element, the locus of points defined by the TDOA is one half of a hyperbola whose axis is the line connecting the two transmit antenna elements. Considering the situation in three dimensions, the locus of points defined by the TDOA is one half of the corresponding hyperbola of rotation.

In FIG. 8, considering a receiver distant from the transmitter apparatus of FIG. 7, wavefronts 430, 440 will pass receiver antenna element 560 with a TDOA 580 comprised of the net delay due to the delay structure of the transmitter device of FIG. 7, plus the TDOA 590 due to the angle between the axis of the transmit antenna structure of FIG. 7 and the direction from the center of said axis to receive antenna 560.

Figure 2:
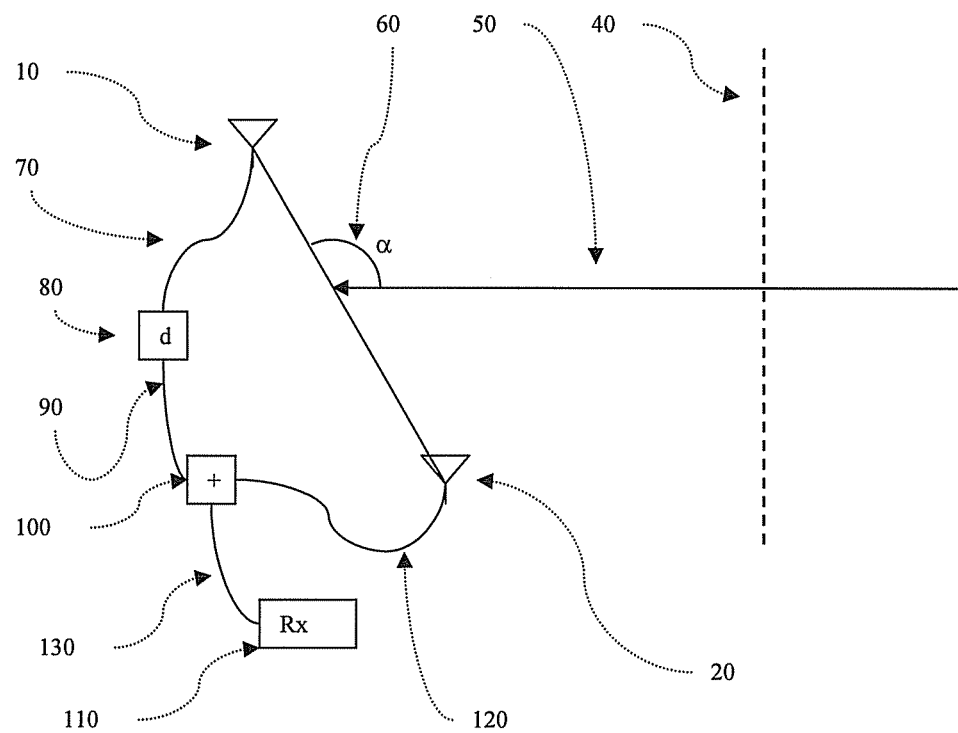
FIG. 2 shows a representative embodiment of the present invention including coaxial cables connecting antenna elements and delay element and signal combiner to receiver and processor element.

Upon reception of the signal comprising the two wavefronts 430, 440, the receiver 550 may process the incoming signal using the techniques and algorithms described above for processing the incoming signal in receiver circuit 110 of FIGS. 2, 3, and 4.

Implementation Considerations

The directional reception capability of the systems and methods described herein may be a basic function, and can be an element of a wide variety of systems, some involving little external integration, and others involving various capabilities in concert to deliver specific system capabilities. In this section, we provide some considerations for the design of directional receiver incorporating aspects described herein.

Antenna Considerations

Proper functioning of the TOA, TDOA, and AOA processes of these directional receivers may depend on factors relating to the antennas. Those skilled in the art will recognize that the individual antenna elements 10, 20 referred to in this description can themselves be directional antenna elements of well known types, such as flat panel antennas, parabolic reflector antennas, yagi antennas, and possibly others, which may provide increased gain or other desired properties in a preferred direction or directions, and the use of which will provide that embodiment with increased sensitivity in a preferred general direction. The resulting configuration may provide sensitivity in the approximate direction based on the use of conventional directional antenna elements, with precision directional sensitivity provided as described herein.

Using methods that are familiar to those skilled in the art, one can build a rigid structure to maintain a fixed separation between antenna elements 10, 20, and therefore after careful measurement the distance b between antenna elements 10, 20 can be known with precision.

FIG. 2 shows a representative embodiment of the present invention including coaxial cables 70, 90, 120, 130 connecting antenna elements 10, 20 and delay element 80 and signal combiner 100 to receiver and processor circuit 110. In the example of FIG. 2, the signals from antenna elements 10, 20 are conveyed to a signal combiner 100, which may have the effect of adding the time domain waveforms seen by the antenna elements 10, 20, with delays due to propagation delay in the coax elements 70, 90, 120 and the additional delay imposed by delay element 80. In one embodiment of the present invention, the purpose of this structure of delays may be to assure that the net delay seen by receiver processor circuit 110 is never less than the sum of delays from coax connections 70, 90 and delay element 80, less the delay due to coax connection 120. These delays may be planned and implemented such that the minimum net delay seen by receiver processor circuit 110 is always large enough to permit receiver processor circuit 110 to determine the two TOA values separately, and identify which signal is associated with which antenna element. That is, the delays can be chosen such that the signals from the wave front 40 originating in the two different antenna elements 10, 20 will never be ambiguous as they arrive at receiver processor circuit 110, because for example, by design, waveform energy from antenna element 20 will always precede the waveform energy from antenna element 10 in the combined signal. For waveforms 40 which are either of sufficiently short duration, or whose duration in their de-spread/compressed form are sufficiently short, this provision may mitigate risk of destructive interference that might otherwise interfere with operation or reduce SNR. This may prevent the two copies of the signal from "stepping on" each other, and may remove half of the ambiguity in the two-element case. That is, the receiver then knows which antenna element originated which signal copy, but the well-known left-right ambiguity may remain.

Those skilled in the art will recognize that, using the antenna for reception, signal losses associated with transmission of the signals down the coaxial cables and through the combiners may require the addition of one or more amplifiers and/or pads in order to produce the desired balance of signal amplitudes arriving at receiver processor circuit 110, and prevent reflections from corrupting the combined signal. Indeed it is normal practice in some embodiments of antenna elements to provide a LNA at the antenna elements themselves, in order to improve the overall noise figure of the system. These matters are well understood and those skilled in the art will see from the present drawings and descriptions how such modification would be made to create various embodiments of the present invention and will recognize that such modifications could easily be made in such a way as to preserve the desired effect of the present invention.

Additional amplifiers and pads may be employed to reduce reflections and achieve desired relative signal levels. That is, low noise amplifiers, pads, and combiners to combine the signals from the plurality of receive antenna elements may be employed so that the combined signal at the receiver is free of reflections and the relative amplitudes of the individual signals are adjusted to the desired relative levels.

By use of suitable RF splitters, LNAs, pads etc., antenna elements may be configured to provide signals to more than one receiver according to the present invention. Thus for example a plurality of receiver antenna elements in a suitable geometry could be configured to provide pairwise combinations of signals to a plurality of receiver circuits 110 according to the present invention, with the TDOA data from the plurality of receivers being combined to provide unambiguous three dimensional AOA measurements. Such an arrangement may minimize the self-interference effects that would occur from having more than two signals combined on a single receiver input, at the cost of employing multiple directional receiver circuits 110. Similarly, it might be desirable to have both a directional receiver according to the present invention and a conventional receiver for other purposes, such as recovery of an information message, or processing for different signals or using different algorithms. In such a case, one of the antenna elements used by the directional receiver could be arranged by the above splitter/LNA etc. method to provide a single-antenna signal for the second receiver.

Self-Interference, and Methods for Minimizing Self Interference

One effect of using a plurality of receiving antennas, all connected to a single input port of a receiver processor circuit 110, is that multiple copies of the transmitted signal 150 may be delayed and added together into the single real analog signal 170. Signals 150 may often have durations varying up to hundreds of microseconds or longer, making it impractical to insert delays in the input connections of sufficient duration to assure that the energies from input antenna elements 10, 20 do not overlap in time. Therefore, for much of their durations the signal energies from signal 150 collected separately by antenna elements 10, 20 may overlap in time, resulting in constructive or destructive self interference at those times when signal energies from both copies of signal 150 are present. This self-interference may result in a loss of SNR for each of the signals recovered in the recovered transmitted signal 200. Use of additional antenna elements connected to a single input port of receiver processor circuit 110 may exacerbate this problem.

The above problem may be minimized by limiting the number of receiver antenna elements to two. If the signal of interest is a sufficiently brief single pulse, this problem can also be alleviated using suitable delays 80 to assure that duplicate copies of the pulse do not overlap each other in the composite signal 130. Moreover, by using sparse spreading codes, the problem may be reduced further. Indeed, the sparseness, or duty cycle, of the spreading code can be set to result in a wide range of reductions of this problem of self-interference.

Processing Requirements, Synchronization

Some embodiments of the present invention can obtain the desired benefits with the use of modest processing capabilities. This can be important in size/weight/power effects. For example, full real time processing capability can require collecting and sampling a giga-sample or more per second, with digital signal processing (DSP) steps in both the time and frequency domains, entailing hundreds or a few thousand digital Fourier transformation operations on 2^20 complex samples. Even with current processing capabilities (large FPGAs, advanced graphic processing units (GPUs)) such sampling and processing can require resources that may be prohibitive for small, perhaps hand-held or man-carried applications. These requirements can be substantially reduced in applications in which there is a means available to the receiver to determine the time of arrival of the signal, to reasonable approximation.

For example, in applications wherein the GPS is available, at least to the extent of reliable pulse-per-second (PPS) output from the GPS device, the transmitter and receiver can collaborate on a planned schedule of transmissions. Such synchronization may not need to be accurate to the nanosecond; reduction from full real time collection to a few milliseconds per cycle can make enough difference in size/weight/power (SWAP) characteristics.

Depending on the requirements of the particular application, synchronization can be accomplished by GPS, by stable or accurate internal time source(s), by use of a common triggering signal, or by other means. Similarly, in an embodiment using the transponder mode, in which the receiver interrogates the transmitter, which responds with a known time delay, the receiver may need only listen for a time interval long enough to hold the signal, plus an increment for range uncertainty, plus margin for any other uncertainties. For an RF system, these uncertainties can be small—light travels a mile in about 6 microseconds—so the required reception window may be small enough that an ordinary processor could easily manage it—no FPGA or GPU required.

In some applications of the present invention, the same transmitter signal can be used by both long range receivers, to assist in localizing the transmitter, and by short range, hand-held receivers. An example would be a rescue system in which a person in distress activates a transmitter, and the signal is received aboard a rescue helicopter, which then proceeds to the vicinity of the transmitter. If the transmitter is in a building, the rescuers may use a small handheld receiver that responds to the same signal, in order to proceed to the right location in the building. Such a hand-held device could trigger on the signal with only modest processing, due to the strength of the signal being higher at short range. That is, the system may be so designed that reception at long range would require the processing gain obtained by de-spreading, but at close range the transmitted signal itself could trigger the receiver, so that a close range hand-held receiver could collect the signal over a short interval.

Similarly, where battery size is a concern, in applications in which may need to be in a "seek" mode for only a brief time, full scale real time processing may be accomplished with modest battery drain if the seek time is short. Applications with this property may include for example a group identification approach in which members of the group are equipped with transmitters, and a portable battery operated receiver may need only to collect the signals on an occasional basis. Such a portable receiver system might be employed, for example, to search for hikers who have become lost in the wilderness Waveform Considerations In this section we will focus on RF embodiments, and more narrowly on aspects of broadband waveforms in relation to embodiments of the present invention. Broadband waveforms may be of particular interest because they typically have fast rise-times and/or sharp peaks, which makes them suitable for the precision time of arrival measurements that enable good angle or arrival measurements.

Those skilled in the art will recognize that various broadband waveforms are available for which the systems and methods described herein may operate efficiently, and that these varieties may include some which have additional capabilities, such as data transmission, jam resistance, and low probability of detection (LPD). Accurate AOA determination may be added with good performance, using antenna arrays of modest aperture, to components of existing systems, resulting in valuable improvement in system effectiveness, as shown by brief discussions of some examples below.

In one embodiment, the RF signal of interest 150 being transmitted by the distant transmitter may be a short pulse, or equivalently any of a wide selection of spread spectrum signals, which may be de-spread by the receiver processor circuit 110, resulting in a short baseband pulse. In one class of embodiments such a spread spectrum signal may be comprised of a sparse, low duty cycle burst of short pulses. Use of sparse, low duty cycle spreading codes may provide several advantages, including reduction of negative effects due to destructive self-interference support of ling codes, support of many different codes (as compared to conventional orthogonal CDMA codes, of which there are not large numbers), and potential desirable LPD and anti jam characteristics.

Transmitters may use signals and waveforms having low probability of detection characteristics, for example by employing sparse wideband spreading codes and other waveform characteristics known in the art and used to make signaling systems secure.

Some embodiments may involve information messages as well as individual (compressed) pulses. Such messages, involving repetitions of the spreading code, may provide large numbers of observations which can be used to both smooth the history of AOAs and, for moving participants, provide data for localizing and tracking.

In embodiments using spread spectrum signals to transmit information, the signal of interest 150 may be a series of short pulses resulting from application of a spreading code to an information signal. Moreover, in some embodiments there may be a plurality of spreading codes in use, allowing a plurality of users to operate in a particular band, using standard CDMA (code division multi-access) technology. A variety of spread spectrum CDMA systems are standard art; the global positioning system (GPS) is one example. In such embodiments, the de-spread signal 200 may contain a corresponding series of baseband pulses for each of the plurality of receive antenna elements. In such an embodiment, peak detector 205 may recover the series of peaks corresponding to each of the plurality of receive antenna elements, and TOA estimator 215 may associate those peaks originating from a particular receive antenna element with that particular receive antenna element. The sequence corresponding to a single receive antenna element may provide receiver processor circuit 110 with the information signal originally sent by the distant transmitter. In such an embodiment, AOA estimator 235 may obtain a corresponding sequence of AOA estimations, each corresponding to a single de-spread peak in the original spread spectrum signal 150, and each being associated with its TOA. Such a sequence of AOA estimations 240 may provide a history of AOA values over time. Such a history over time may be useful in localizing or tracking a transmitter from a moving receiver, or in tracking a moving transmitter or in validating the source of the signal (for example detecting spoofing attempt based on comparing observed AOA to expected AOA from an authorized transmitter).

Transmitters that employ occasional transmissions, as may be appropriate for tagging and tracking rather than general communication purposes, can be configured to encode ID information and optionally additional information bits to convey status or other similar data. These signal characteristics can be compatible with AOA measurement in accordance with the present invention.

For spread spectrum signals, use of sparse codes may reduce potential of self-interference. That is, spread spectrum signals, with or without frequency hopping, may be employed with chips of duration short enough that practical delay elements in the receiver antenna structure can assure that the same chips in the incoming signal do not step on each other in the combined signal. Sparse spreading codes in the signal may reduce the likelihood of any two chips in the incoming signal, even in different locations in the spreading code, stepping on each other in the combined signal, thereby reducing the effect of self-interference.

Low duty cycle signals, in the sense that the spreading codes are not repeated continuously as is the practice in conventional spread spectrum applications like GPS, but rather are transmitted individually, in some embodiments using preplanned precision time intervals between said transmissions of a single spreading code, may reduce difficulties due to self interference, while timing information and information bits can be encoded in the series of transmitted spreading codes.

Transponder Mode

In one class of embodiments, the transmitters and receivers may be set up to operate in transponder mode. That is, the directional receivers may be configured with a suitable RF interrogator, and the transmitters may be configured with a capability to receive the interrogation signal and to respond to the interrogation with a precisely determined delay. Such a transmitter is referred to as a transponder. In such a system, the transponder delay may be known to the directional receiver, thereby enabling the directional receiver device to obtain both accurate AOA information as before, plus ranging information accurate to as little as a fraction of a meter, based on knowledge of the flight times and delays of the signals involved, all without benefit of GPS. One embodiment may combine the interrogator and AOA receiver in the same device, so that the plurality of interrogator/receivers, and the plurality of transmitter/responders, would comprise a transponder system.

In some embodiments it may be preferred not to include the transponder component. In some applications inclusion of the transponder component may materially improve performance of the overall system, because the addition of accurate range information enables the use of well known techniques of multilateration in estimating the location of the transmitter. Indeed, the performance of multilateration systems can be significantly improved by the addition of angle of arrival information per the present invention.

For example, some existing multilateration systems are enabled to operate without GPS at the transmitters by use of highly stable clocks in the transmitters, so that the receivers, using receptions at different times and locations, can localize by solving for transmitter clock drift as well as position. This is equivalent to what GPS does, in solving for latitude, longitude, elevation, and receiver clock error. For this to work, the transmitter must have a stable time source that exhibits stable drift, so that drift can be accurately characterized by a single parameter over the appropriate time intervals, and the resulting calculation has only four unknowns. Many observations are required, and localization accuracy is limited, with typical errors several times the typical GPS localization error.

Adding AOA information may remove ambiguities and possible pathological cases that may otherwise be present in multilateration calculations, and may provide an additional independent measurement, which may reduce expected errors in the solution. Moreover, reliance on AOA observations can relax the criteria for transmitter clock stability, making the technology usable with a wider variety of transmitters.

With the addition of transponder mode, the system may obtain accurate range information. Other multilateration systems operate with what are known as pseudo-ranges—that is, direct measures of the time of flight of a signal, where the dominant error is clock drift. Receivers configured using the techniques described herein and including transponder mode may obtain precise ranges, not pseudo-ranges, which may reduce the dimensionality of the calculation and remove clock drift as a factor.

Those skilled in the art will recognize, in many of the example applications described below, that the inclusion of transponder mode may make major improvements in system performance.

Example Applications of the Present Invention

To illustrate the broad range of applications of the present invention, we describe several examples. These are examples only, and those skilled in the relevant arts will realize that many other variations are possible.

Detection/Correction of GPS, INS Drift and Errors

For example, in one embodiment, GPS receive antennas and processor could be configured as described herein in order to provide the receiver with accurate AOA estimates over time for the satellite or pseudo-satellite signals being used in the GPS solution, thereby making possible the detection of spoofing attempts by hostile transmitters of "GPS" signals by detecting that they are coming from the wrong direction. The directional accuracy obtained by small aperture receive antennas may improve the effectiveness of the approach to GPS spoofing detection using AOA measurements, since many GPS installations lack room for antennas of more than modest aperture.

Similarly, absent GPS, long range or long duration flight navigation by INS is subject to INS drift, and use of accurately pre-positioned ground transmitters could provide corrections; this function may be particularly effective in transponder mode.

Airborne Applications

The capabilities offered by airborne embodiments of the present invention can support numerous valuable applications, depending on the nature and mission of the aircraft or other air/space based vehicle involved, the transmitters to be used (tags intended for this use, or existing transmitters with other purposes, etc.) and other factors such as whether the transmitters are stationary or mobile, what is known a priori about the transmitters, etc.

A Plurality of Fixed Ground-Based Receivers Track Aircraft

Each of a plurality of receivers may obtain a directional reception from a particular transmitter. Data (including AOA measurements) from the receivers, together with knowledge of the locations of the plurality of receivers, may permit three dimensional localization calculation for the transmitter of the received signal. So, for example, an aircraft equipped with a transmitter could be localized by a fixed set of directional receivers, for example placed near an airport. Such a system could fill the function of radar for tracking such aircraft.

Aircraft Equipped with AOA Receivers Localize and Track Transmitters

In one example embodiment, an aircraft with AOA receiver obtains AOA observations for airborne or ground transmitters, and may be able to localize and track those transmitters. For simplicity of exposition, we describe the case where the aircraft has three antenna elements rigidly fixed to its structure in a triangular arrangement, for example both wingtips and near the tail. Note that this wide aperture may provide good AOA accuracy. If flexing of the aircraft structure becomes a problem, the calculations could be calibrated using accelerometers to adjust the geometry of the antenna elements appropriately.

One embodiment of the present invention would be a receiver on board an aircraft, with three receive antenna elements fitted rigidly to the air vehicle in geometry suitable to support three-dimensional angle of arrival observation. Incoming signals may result in accurate three dimensional AOA measurements in accordance with the previously described systems and methods. These AOA measurements may provide the angle relative to the plane containing the three antenna elements, and that plane would provide a fixed and known geometric relationship for the antenna elements on the aircraft. (Because aircraft structure can change slightly with wing loading, it may be appropriate to include a calibration calculation based on accelerometer or other instrument readings to adjust the exact geometry of the antenna array to compensate for these changes in aircraft structure in flight.) There may be the ambiguity as to which side of the plane the signal was arriving from, but as previously discussed, this ambiguity may be resolved based on known geometry of the situation and/or analysis of measurements from different receiver positions.

Internal to the receiver, the AOA may be calculated relative to the plane defined by the receive antenna elements and transformed to the axes of the aircraft. To use these values for navigation purposes, or to assist in localizing the transmitter, the aircraft system can use information from flight instruments and/or external aids such as GPS to convert the angles with respect to the plane of the receive antenna elements into the angles with respect to the frame of reference within which the aircraft is operating, for example the GPS Earth centered—Earth fixed (ECEF) frame of reference. If no accurate positioning data, such as GPS, is available, one could still obtain 3D AOA with respect to the local horizontal, and the aircraft could still be flown directly to the transmitter using well known DF (direction finder) flight techniques.

In one localization application, an aircraft equipped with a three dimensional AOA receiver can, by observing accurate 3D AOA of a fixed or slow moving transmitter on the ground, from each of a series of positions along its flight path, where onboard instrumentation such as INS or other means provides the aircraft with accurate flight path data, obtain accurate relative location (subject to GDOP—geometric dilution of precision—as used in GPS applies to the present invention as well) information for the ground transmitter. If the aircraft is able to register itself to a grid such as the GPS frame of reference, then the observed localization of the transmitter will also be registered to that grid.

The transmitter may be moving slowly compared to the velocity of an airborne receiver, and the localization system may obtain an estimate of the transmitter's trajectory from a sequence of AOA observations, optionally augmented with terrain data if the moving transmitter is ground-based.

Guidance of Aircraft to Ground Transmitter

In another application, by using a three dimensional directional receiver embodiment of the present invention, an aircraft can use the received three dimensional AOA information to guide its flight to the location of the transmitter. In such an application, the receiver could be incorporated in an aircraft, and the transmitter could be attached to a destination (landing zone, for example). For a stationary target, such a guidance capability would permit the aircraft to fly directly to the transmitter with no other external guidance information required. For a moving target, provided the target motion were slow compared to the speed of the aircraft, and provided the target motion did not exceed the dynamic motion capability of the aircraft, the aircraft could still fly directly to the target.

In a similar application, the receiving system could be used, for example, on a rescue helicopter with the transmitter being operated by persons in need of rescue or extraction. A helicopter pilot could use standard piloting techniques to fly a DF approach to the transmitter. Data from the receiver could be used to create a software instrument displaying standard aircraft instrument images to the pilot. This display could also use data from onboard instruments, digital maps, etc. to improve the presentation.

Blue Force Tracking

The localization capabilities inherent in the present invention can be applied to blue force tracking. For example, a standoff surveillance aircraft with directional receiver could track three dimensional AOAs for all transmitters in use by dismounted individuals, ground vehicles, ground installations, and/or other aircraft in the coverage area.

Even a single aircraft can equipped with an omni-directional antenna array can observe, identify, and obtain AOA estimates from each suitable transmitter in line of sight. This AOA data could be combined with onboard navigation and map data to estimate transmitter positions.

A plurality of receiver-equipped aircraft, if they have good position information, can collaborate to obtain position estimates for a transmitter in view. The intersection of their azimuth and elevation observations may provide a reasonable position estimate.

If the receivers on such aircraft are operating in transponder mode, where a receiver aircraft sends an interrogation to the transmitter and the transmitter responds, the interrogator may obtain accurate range, as well as azimuth and elevation. Given the receiver's good position information, these range, azimuth, and elevation observations can be registered to the ECEF (earth centered, earth fixed) grid.

If there are a plurality of receivers collaborating in transponder mode, a concern might arise that too many interrogations and responses would be required. This problem can be addressed as follows: One interrogation is sent, say by receiver RX1, and is heard by receiver RX2, as well as by the transmitter. The transmitter sends its response, as usual. RX2 also hears the response. Then by combining observations of RX1 and RX2, the system can obtain the sides of the triangle formed by positions of RX1, RX2 and the transmitter, in the following manner: RX1 knows the time it sent the interrogation, and the time the response was received. This difference will be just twice the flight time of the signal, plus the programmed delay of the transponder. So RX1 can calculate r1, the range to the transmitter, by observing the TOA of the response. Similarly, RX2 can use its TOA of the transmitter's response to calculate the sum of r1 plus r2, the distance from the transmitter to TX2, less r12, the distance from RX1 to RX2. So combining the data, we have:
1. RX1: notes the time it sends the interrogation
2. RX1: calculates r1, observed from the transponder reply signal from the transmitter
3. RX2: observes the time the interrogation arrives, and from the time of transmission recorded by RX1, calculates r12, the range from RX1 to RX2.
4. RX2: observes the TOA of the transponder response sent by the transmitter, and from that, and knowing the time RX1 sent the interrogation, calculates r1 plus r2, obtaining r2.

Thus the two receivers and the transmitter in collaboration can obtain the sides of the triangle formed by the locations of the two receivers and the transmitter, and therefore solve the triangle. Assuming the participants are aircraft, addition of compass data can orient the triangle. If multiple receivers are collaborating, there are more triangles that can be solved and oriented in similar ways, and combined to produce relative positioning and orientation of all participants. Errors can be reduced using methods familiar to surveyors who must estimate three-dimensional positions based on numerous observations. Note also that registering such two dimensional triangles in three dimensions can be aided by the azimuth and elevation observations of the receivers involved.

In this fashion a plurality of receivers can accurately localize a plurality of transponders by use of a single interrogation, assuming all participants are in line of sight range of each other.

Note further that even if GPS is unavailable and accurate position is not known by the receivers a-priori, these measurements by the receivers, both azimuth/elevation and range estimates, do not depend upon receivers' knowledge of its their positions. The errors in the resulting triangle(s) side measurements may depend on the stability of the receiver clocks, and may be accurate to the resolution of the TOA observations (plus very small uncertainty in transponder delay). Thus it is not unreasonable to expect the triangle dimensions to be highly accurate, depending on the quality of the implementation.

Note further that the above arrangement has the virtue that only one (or a few, in case there are many participants and over an area that includes line of sight restrictions) interrogation may need to be sent for multiple receiver and transmitter units in range of each other. Thus the number of responses transmitted may grow only linearly with the number of transponders, and may be independent of the number of receivers.

Aircraft Positioning from Surveyed Ground Transmitters

Figure 9:
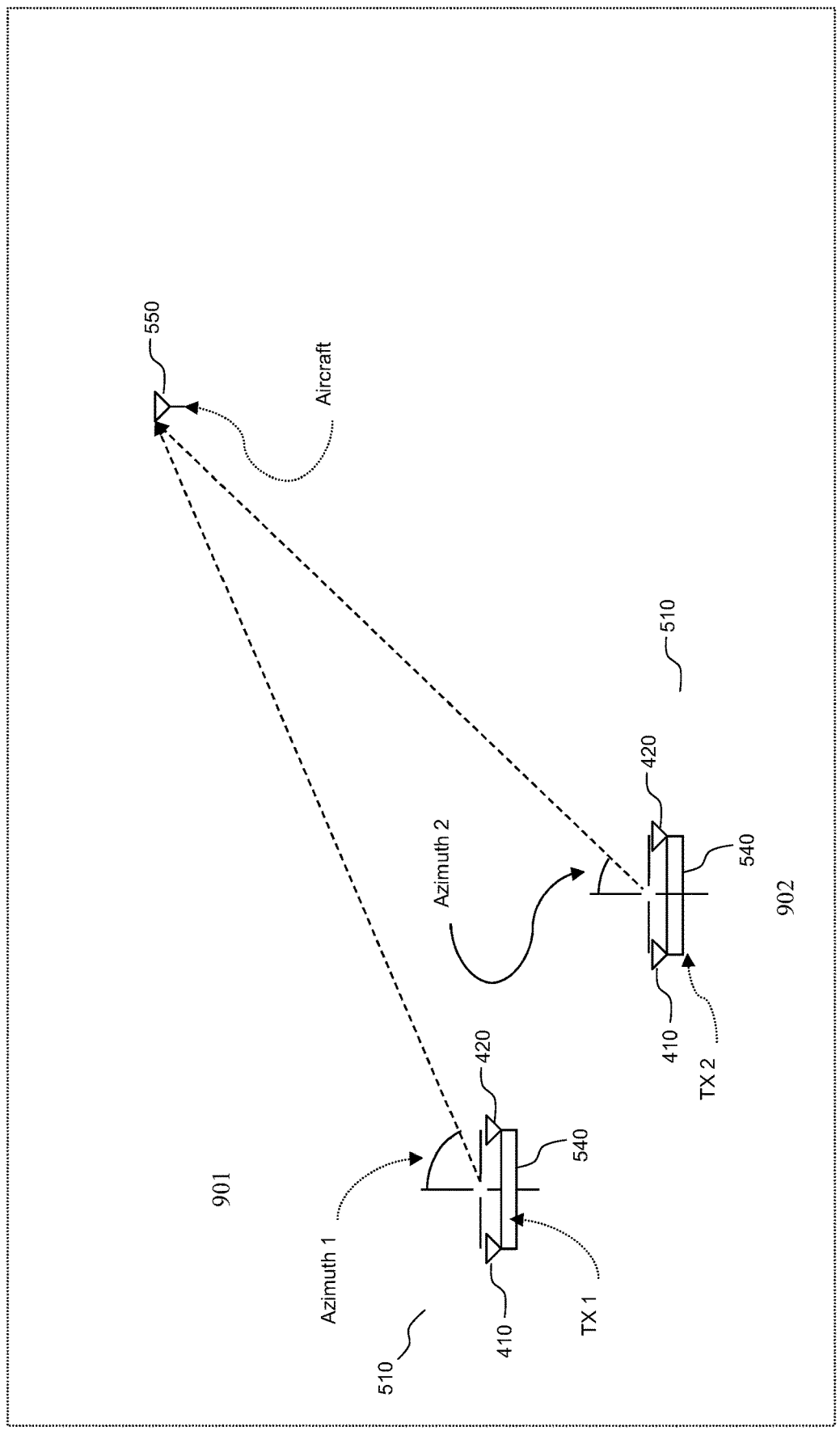
FIG. 9 shows a representative embodiment including a plurality of transmitters as described in FIG. 7 positioned at known locations.

In one class of applications, the transmitters can be fixed at precisely surveyed locations, as shown in the representative embodiment of FIG. 9, and can include their ID in their transmissions, and data regarding the positions (transmitters located at positions 901 and 902) and IDS and transmission schedules of the transmitters can be provided to the receiving systems.

In such a configuration, the aircraft can obtain navigation information even without access to GPS. If the ground transmitters are accurately synchronized (so that their relative transmission times are known to within nanoseconds), the receiver on the aircraft can obtain position from comparison of the TDOAs of different transmitters, using well known multilateration techniques such as are used for positioning in LORAN. This multilateration plus accurate AOAs provided by the systems and methods described herein may provide accurate real time localization, without reliance on GPS if the synchronization means does not use GPS. Alternatively, the ground transmitters can be synchronized by some means, such as a local timing signal, accurate onboard clocks, or other methods. Note that this synchronization may not necessarily depend the precise time; the exact time of transmission may be unnecessary, because multilateration relies only on the relative timing. Non-GPS synchronization could be obtained, for example, by timing pulses transmitted by wire, or by RF.

If the above accurately positioned ground transmitters are not accurately synchronized, the aircraft with the directional receiver can develop accurate track information by integrating three dimensional AOA to each transmitter taken at a plurality of times along the aircraft track; these data can be augmented by track information obtained from onboard instrumentation such as INS to provide accurate positioning with respect to the ground transmitters. Assuming the transmitters are positioned reference the GPS grid, the resulting localization and track information in the aircraft may also reference the GPS grid. And if the embodiment includes transponder mode, the measurements may be much more accurate.

Air to Air Applications

The present invention may be applied with both transmitter(s) and receiver(s) employed on aircraft. for example, in precision station keeping for aircraft flying in formation, where a large aperture is available by use of antenna elements on wingtips, giving accurate AOA at long range, to support rendezvous. Where true ranges from the transmitter in the lead aircraft may be only a modest multiple of the wingtip to wingtip aperture, it may be appropriate to use a smaller aperture antenna, or to provide both large and smaller aperture arrangements.

An example of such an instance would be an aircraft approaching an airborne tanker for refueling. This application may require both long range operation, for rendezvous, and precision short range operation for maintaining connection during the fueling operation. If the approaching aircraft had directional receive antenna elements on its wingtips, and required precise AOA from a transmitter mounted on the refueling drogue of the tanker, close range AOA could be obtained using a receiver according to the present invention having an appropriately smaller aperture.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the scope of the invention should not be limited by any of the above-described embodiments.

In addition, it should be understood that any figures which highlight the functionality and advantages are presented for example purposes only. The disclosed methodology and systems are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A navigation system comprising:
a plurality of synchronized transmitters at known locations, each comprising a respective output port, each output port being coupled to a plurality of transmit antenna elements fixedly configured into a known geometric relationship to each other, wherein each output port is coupled to the plurality of transmit antenna elements by one of a plurality of circuits, each of the plurality of circuits adding one of a plurality of known, fixed delays;
at least one receiver mounted on a vehicle comprising at least one receive antenna element and an output, configured to receive signals from the transmit antenna elements from the output ports of the transmitters; and
a circuit, coupled to the output of the at least one receiver, including a time of arrival estimator configured to determine, from the signals received from the output ports of the transmitters, time differences at which signals from the transmitter are incident upon the antenna elements and an angle of arrival estimator configured to determine an angular orientation of the transmit antenna elements to the at least one receive antenna element based on the time differences and the known, fixed delays.

2. The navigation system of claim 1, wherein the plurality of transmitters are synchronized by at least one of local timing signals, timing signals sent by a wire, or timing signals sent by radiofrequency (RF).

3. The navigation system of claim 1, wherein the receiver comprises a RF interrogator and the system comprises a plurality of additional receivers associated with the plurality of synchronized transmitters.

4. The navigation system of claim 3, wherein:
the RF interrogator is configured to generate an interrogation and transmit the interrogation to the plurality of additional receivers;
the plurality of additional receivers are configured to receive the interrogation and observe a time of transmission of the interrogation with at least one of the known, fixed delays of the receiver's antenna elements;
the receiver is configured to observe a time of arrival of the signal from the transmit antenna elements; and
the circuit is configured to obtain an estimate of a range from the receiver to the transmitter based on the time difference between the transmission of the interrogation and the reception of the signal from the transmit antenna elements, wherein the estimate includes a compensation for the known, fixed delay.

5. The navigation system of claim 4, where the circuit is configured to obtain a plurality of estimates over time to track the vehicle.

6. The navigation system of claim 1, wherein the at least one receiver operates in a transponder mode.

7. The navigation system of claim 1, wherein the plurality of transmitters comprises four transmitters.

8. The navigation system of claim 1, wherein the vehicle is an air-based vehicle or a space-based vehicle.

9. The navigation system of claim 1, wherein the circuit comprises a conditioner configured to process the received signals to produce a matched filter output.

10. The navigation system of claim 1, wherein the signals received from the plurality of transmitters are low duty cycle signals.

11. The navigation system of claim 10, wherein the low duty cycle signals are transmitted using pre-planned time intervals between each transmission of a single spreading code.

12. The navigation system of claim 1, wherein the vehicle is configured to travel to a destination defined as a region of space contained in specified azimuth and elevation limits from at least one of the plurality of transmitters, including the location of the transmitter itself, using the determined angular orientation and a direction finder (DF) flight technique.

13. The navigation system of claim 1, wherein each plurality of transmit antenna elements comprises three or more transmit antenna elements.

14. The navigation system of claim 1, wherein the signals comprise low probability of detection (LPD) signals.

15. A navigation system comprising:
a plurality of un-synchronized transmitters at known locations, each comprising a respective output port, each output port being coupled to a plurality of transmit antenna elements fixedly configured into a known geometric relationship to each other, wherein each output port is coupled to the plurality of transmit antenna elements by one of a plurality of circuits, each of the plurality of circuits adding one of a plurality of known, fixed delays;
at least one receiver mounted on a vehicle comprising at least one receive antenna element and an output, configured to receive signals from the transmit antenna elements from the output ports of the transmitters; and
a circuit, coupled to the output of the at least one receiver, including a time of arrival estimator configured to determine, from the signals received from the output ports of the transmitters, time differences at which signals from the transmitter are incident upon the antenna elements and an angle of arrival estimator configured to determine an angular orientation of the transmit antenna elements to the at least one receive antenna element based on the time differences and the known, fixed delays.

16. The navigation system of claim 15, wherein the circuit is configured to:
determine a plurality of angular orientations associated with the plurality of transmitters at a plurality of times; and
augment the plurality of angular orientations with track information obtained from an onboard system of the vehicle to provide positioning information relative to the plurality of transmitters.

17. The navigation system of claim 16, wherein the onboard system comprises at least one of a compass, an inertial navigation system (INS), or a global positioning system (GPS) or other system producing information of utility for navigation.

18. The navigation system of claim 15, wherein the receiver comprises a RF interrogator and the system comprises a plurality of additional receivers associated with the plurality of transmitters, wherein:
the RF interrogator is configured to generate an interrogation and transmit the interrogation to the plurality of additional receivers;
the plurality of additional receivers are configured to receive the interrogation and observe a time of transmission of the interrogation with at least one of the known, fixed delays;
the receiver is configured to observe a time of arrival of the signal from the transmit antenna elements; and
the circuit is configured to obtain an estimate of a range from the receiver to the transmitter based on the time difference between the transmission of the interrogation and the reception of the signal from the transmit antenna elements, wherein the estimate includes a compensation for the known, fixed delay.

19. The navigation system of claim 15, wherein the circuit comprises a conditioner and a signal processor configured to process the received signals to produce a matched filter output.

20. The navigation system of claim 15, wherein the signals received from the plurality of transmitters are low duty cycle signals.

21. A navigation system comprising:
a plurality of synchronized receivers at known locations, each comprising a respective input port, each input port being coupled to a plurality of receive antenna elements fixedly configured into a known geometric relationship to each other, wherein each input port is coupled to the plurality of receive antenna elements by one of a plurality of circuits, each of the plurality of circuits adding one of a plurality of known, fixed delays;
at least one transmitter mounted on a vehicle or a projectile comprising at least one transmit antenna element and an output, configured to transmit signals to the receive antenna elements from the output of the transmitters; and
a circuit, coupled to the input ports of the plurality of receivers, including a time of arrival estimator configured to determine, from the signals received from the output of the transmitter, time differences at which signals from the transmitter are incident upon the receive antenna elements and an angle of arrival estimator configured to determine an angular orientation of the transmit antenna elements to the receive antenna elements based on the time differences and the known, fixed delays.

22. The navigation system of claim 21, wherein the plurality of receivers are synchronized by at least one of local timing signals, timing signals sent by a wire, or timing signals sent by radiofrequency (RF).

23. The navigation system of claim 21, wherein the plurality of receivers comprise a plurality of RF interrogators and the system comprises an additional receiver associated with the transmitter.

24. The navigation system of claim 23, wherein:
the plurality of RF interrogators are configured to generate a plurality of interrogations and transmit the interrogations to the additional receiver;
the additional receiver is configured to receive the interrogations and observe a plurality of times of transmission of the interrogations with at least one of the known, fixed delays of the receiver's antenna elements;
the plurality of receivers are configured to observe a time of arrival of the signal from the transmit antenna elements; and
the circuit is configured to obtain an estimate of a range from the receivers to the transmitter based on the time difference between the transmission of the interrogations and the reception of the signal from the transmit antenna elements, wherein the estimate includes a compensation for the known, fixed delay.

25. The navigation system of claim 24, where the circuit is configured to obtain a plurality of estimates over time to track the vehicle or the projectile.

26. The navigation system of claim 21, wherein the plurality of receivers operate in a transponder mode.

27. The navigation system of claim 21, wherein the vehicle is an air-based vehicle or a space-based vehicle.

28. The navigation system of claim 21, wherein the circuit comprises a conditioner configured to process the received signals to produce a matched filter output.

29. The navigation system of claim 21, wherein the signals received from the transmitter are low duty cycle signals.

30. The navigation system of claim 29, wherein the low duty cycle signals are transmitted using pre-planned time intervals between each transmission of a single spreading code.

31. The navigation system of claim 21, wherein the signals comprise low probability of detection (LPD) signals.

* * * * *